United States Patent
Mouquet et al.

(12) United States Patent     (10) Patent No.: US 12,114,260 B2
Mouquet et al.     (45) Date of Patent: Oct. 8, 2024

(54) METHOD FOR DETECTING THE REACHABILITY OF A TERMINAL IN A COMMUNICATION NETWORK

(71) Applicant: Orange, Issy-les-Moulineaux (FR)

(72) Inventors: Antoine Mouquet, Chatillon (FR); Jean-Baptiste Gardel, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 317 days.

(21) Appl. No.: 17/642,076

(22) PCT Filed: Sep. 4, 2020

(86) PCT No.: PCT/FR2020/051532
§ 371 (c)(1),
(2) Date: Mar. 10, 2022

(87) PCT Pub. No.: WO2021/048487
PCT Pub. Date: Mar. 18, 2021

(65) Prior Publication Data
US 2023/0077257 A1     Mar. 9, 2023

(30) Foreign Application Priority Data
Sep. 10, 2019 (FR) .................................. 1909922

(51) Int. Cl.
*H04W 52/00*     (2009.01)
*H04W 28/18*     (2009.01)
(Continued)

(52) U.S. Cl.
CPC ....... *H04W 52/0216* (2013.01); *H04W 28/18* (2013.01); *H04W 76/28* (2018.02)

(58) Field of Classification Search
CPC .. H04W 52/0216; H04W 76/28; H04W 28/18
See application file for complete search history.

(56) References Cited

U.S. PATENT DOCUMENTS

2010/0130237 A1    5/2010   Kitazoe et al.
2017/0164292 A1*   6/2017   Santamaria ............. H04L 67/14
(Continued)

OTHER PUBLICATIONS

Qualcomm Incorporated et al, "Introduction of eDRX in 5GS", vol. SA WG2, No. Kochi, India; Jan. 21, 2019-Jan. 25, 2019, Feb. 28, 2019 (Feb. 28, 2019), 3GPP Draft; S2-1902417, 3rd Generation Partnership Project (3GPP), Mobile Competence Centre ; 650, Route Des Lucioles ; F-06921 Sophia-Antipolis Cedex ; France, Retrieved from the Internet: URL:http://www.3gpp.org/ftp/tsg%5Fsa/WG2%5FArch/TSGS2%5F131%5FTenerife/Docs/S2%2D1902417%2Ezip, XP05161093.
(Continued)

*Primary Examiner* — Erika A Washington
(74) *Attorney, Agent, or Firm* — David D. Brush; Westman, Champlin & Koehler, P.A.

(57) ABSTRACT

A method and device for detecting the reachability of a terminal previously served by a first access device of a registration area of a communication network. The first access device is unable to manage sleep and waking periods of the terminal. The terminal is then served by a second device of the registration area, which is able to manage the periods. The method is implemented by a management entity of the network, which has not been informed of the change of access device. The method includes: exchanging messages with the terminal for registration and negotiation of the sleep and waking periods of the terminal; obtaining an item of information relating to data to be transmitted to the terminal; and sending a contact-establishment request message to the terminal during a determined waking period of the terminal.

12 Claims, 2 Drawing Sheets

(51) Int. Cl.
*H04W 52/02* (2009.01)
*H04W 76/28* (2018.01)

(56) References Cited

U.S. PATENT DOCUMENTS

2019/0116486 A1* 4/2019 Kim .................. H04W 8/10
2019/0223147 A1 7/2019 Chen et al.

OTHER PUBLICATIONS

"Removal of eDRX support with RRC_INACTIVE for NB-Iot", S2-1908410 of 3GPP TSG-WG SA2 Meeting #134, Sapporo, Japan, Jun. 24-Jun. 28, 2019.
International Search Report dated Oct. 26, 2020 for corresponding International Application No. PCT/FR2020/051532, Sep. 4, 2020.
Written Opinion of the International Searching Authority dated Oct. 26, 2020 for corresponding International Application No. PCT/FR2020/051532, filed Sep. 4, 2020.
English translation of the Written Opinion of the International Searching Authority dated Nov. 9, 2020 for corresponding International Application No. PCT/FR2020/051532, filed Sep. 4, 2020.

* cited by examiner

[Fig. 1]
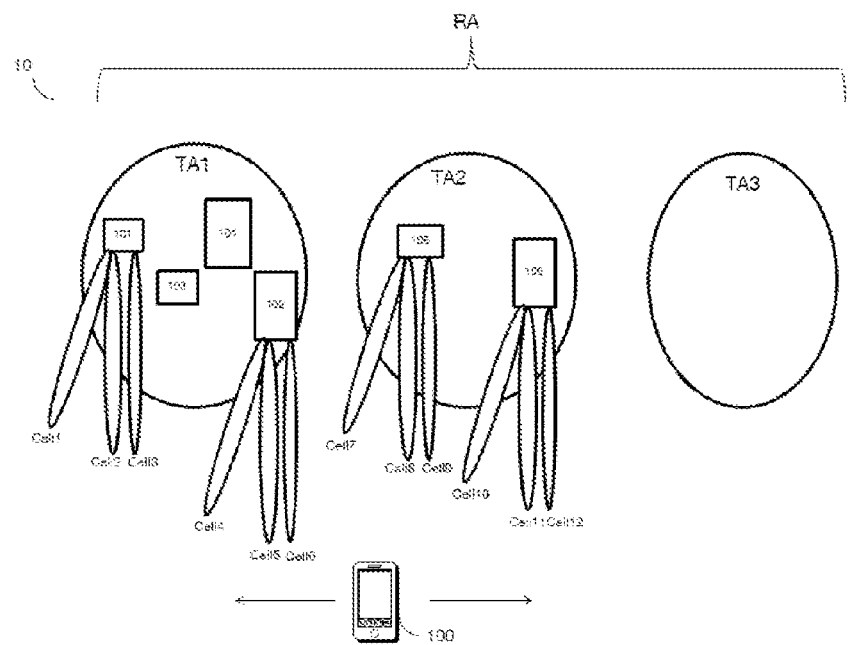
[Fig. 2]
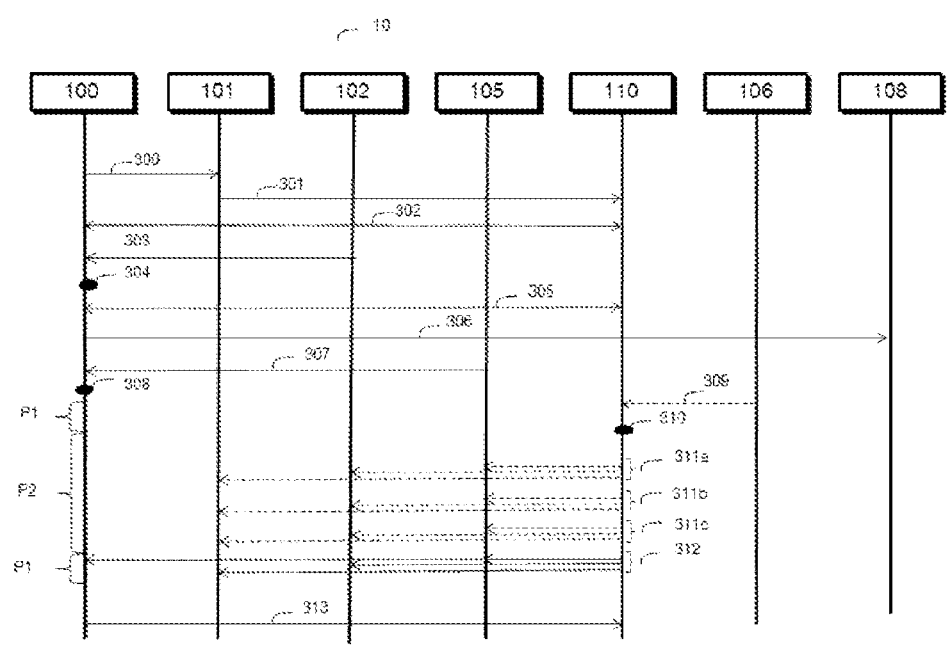

[Fig. 3]
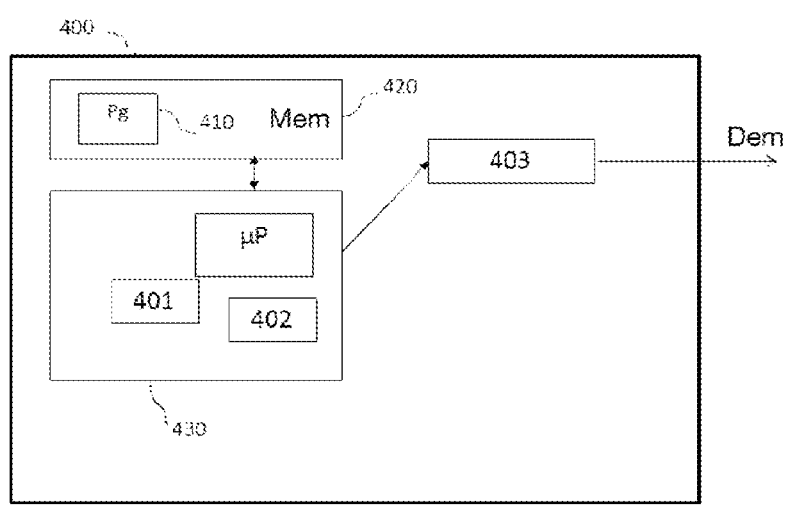

METHOD FOR DETECTING THE REACHABILITY OF A TERMINAL IN A COMMUNICATION NETWORK

CROSS-REFERENCE TO RELATED APPLICATIONS

This Application is a Section 371 National Stage Application of International Application No. PCT/FR2020/051532, filed Sep. 4, 2020, which is incorporated by reference in its entirety and published as WO 2021/048487 A1 on Mar. 18, 2021, not in English.

1. TECHNICAL FIELD

The invention relates to communication networks, in particular mobile communication networks, and aims to allow mobile terminals to be deployed in access environments comprising equipments that do not manage the functions relating to placing mobile terminals in sleep mode in a period of inactivity in a consistent manner.

2. PRIOR ART

The infrastructures of mobile networks may use an eDRX (Extended Discontinuous Reception) function which allows a mobile terminal (UE) to place itself in sleep mode for a duration negotiated between the UE and an equipment of the mobile network with which the UE registers. The sleep duration is negotiated in accordance with cycles comprising successive sleep and waking periods, a sleep period possibly lasting up to 44 minutes or even 3 hours for instances of NB-IoT (NarrowBand Internet of Things) access. During this sleep period, the UE does not receive any contact-establishment (paging) requests from the network. Since the UE does not listen to the paging channel or to any other information broadcast by the network, its electrical consumption is reduced and the life of its battery is extended. The usage of the resources of the network is also reduced due to the postponement of the contact-establishment requests which would prove unsuccessful.

The eDRX function may be implemented by equipments of access networks using various technologies (4G or LTE) with the exception of NR (New Radio) fifth-generation radio access technology. Core network equipments, including fifth-generation core network equipments, are, for their part, capable of implementing this function.

Moreover, the deployment of fifth-generation radio access technology in communication networks will be gradual, and a UE which supports both fourth-generation and fifth-generation radio access technologies will be able to attach to a fifth-generation core network by using at least one of these two radio access technologies interchangeably, and to switch between these two radio access technologies while remining attached to the core network. Such combined use of radio access technologies, in particular fourth- and fifth-generation radio access technologies, will be prevalent, at least in the early stages of deployment of 5G technology.

More specifically, a UE is assigned a registration area, which is made up of a set of tracking areas, is defined by an AMF equipment of the core network and may contain both access equipments (or functions) using fourth-generation technologies, such as eNodeBs (eNB base stations) and equipments (or functions) implementing fifth-generation technologies, such as gNBs (5G base stations using NR technology). A UE may be under the coverage of various cells of the mobile network, each cell belonging to a tracking area and being served either by an eNodeB or by a gNB station, bearing in mind that a gNB or eNodeB node can cover several cells. In "idle" mode, i.e. when the UE is attached to the network but does not have any active communication, the UE "camps" on a single one of the cells which it is under the coverage of (meaning that it is listening for information broadcast in said cell) and selects a new cell autonomously (for example when said UE moves or the radio conditions change) by using the information broadcast in the cells and the information relating to the signal level of the radio transmissions specific to each of these cells. The UE communicates with the core network only if the selected new cell broadcasts an item of information relating to a tracking area which is not part of the registration area of the UE. Bearing in mind that a tracking area (and, a fortiori, a registration area) may include cells served by eNBs and cells served by gNBs, the core network equipments do not know, when the UE is in "idle" mode, whether the cell which the UE has selected is being served by an eNodeB station or a gNB station. A UE which has previously negotiated the use of eDRX when attaching to a communication network may thus select a cell served by an eNB equipment and use eDRX, then select a cell served by a gNB equipment and stop using eDRX, and then once again select a cell served by an eNB equipment without the core network being informed of these changes. If the UE enters "idle" mode on a cell served by a gNB equipment, then selects a new cell served by an eNB equipment, and if the tracking area of the newly selected cell is part of the registration area of the UE, the core network equipments are not informed of this change. In particular, if an AMF (Access and Mobility Management Function) equipment wishes to send a "paging" request to the UE in order to transmit information to said UE, the AMF equipment will consider that the UE is normally reachable since it is not using eDRX as it is being served by a gNB equipment, whereas the UE is being served by an eNB equipment and eDRX has possibly been activated. The AMF will transmit several successive "paging" messages, which the UE will be unable to receive if, as is likely, none of these paging messages is transmitted during a waking period of the eDRX cycle; the AMF will abandon the procedure and the UE will not receive the information intended for it. The fact that the eDRX function is not supported on a gNB equipment, as described in document S2-1908410 of 3GPP TSG-WG SA2, is thus liable to have an impact on the provision of services in a mobile infrastructure and to cause an increase in signaling data on the mobile infrastructure and to reduce the quality of service provided to the terminals connected to the mobile network. The present invention aims to provide improvements over the prior art.

3. DISCLOSURE OF THE INVENTION

The invention aims to improve the situation by means of a method for detecting the reachability of a terminal previously served by a first access device of a registration area of a communication network, said area comprising said first access device, which is unable to manage sleep and waking periods of said terminal, and a second access device, which is able to manage said periods, said method being implemented by a management entity of said network and comprising learning the sleep and waking periods of the terminal, obtaining an item of information relating to data to be transmitted to the terminal, and sending a contact-establishment request message to said terminal during a determined waking period of said terminal.

The terminals may alternate between waking and sleep periods. A waking period is characterized by the terminal listening for and taking into account data transmitted thereto by an access station serving the terminal, in particular contact-establishment request messages, while a sleep period is characterized by a period during which the terminal does not listen for the messages transmitted by the access station serving said terminal and therefore does not receive the messages that may be transmitted thereto.

The presence of access devices that are heterogeneous in terms of supporting a function for managing the sleep and waking states of the terminals, which may be mobile terminals, may lead to a lack of awareness of the state of a given terminal by a management entity of a communication network. This lack of awareness is problematic as it is liable to prevent a communication service from being implemented on the mobile terminals. Indeed, the management entity, mistakenly believing that the terminal is not reachable having sent one or more contact-establishment request messages during a sleep period of the terminal, does not transmit any data to said terminal, and this affects the service implemented by the terminal. The method allows the management entity to obtain an item of information about the reachability of the terminal. Indeed, by transmitting a location request during a waking phase of said terminal by virtue of the previously determined information about the waking and sleep periods, the management entity will receive a response from the terminal and will then be able to transmit the signaling data or application data to be transmitted to the terminal. The method furthermore makes it possible to avoid multiple re-transmissions of terminal location request messages transmitted by the management entity when there is no response from the terminal, these requests most probably being transmitted during sleep periods of the terminal, which are longer than the waking periods.

According to one aspect of the invention, the detection method is implemented when the terminal is in idle mode.

The method is particularly advantageous when the terminal is in idle mode, meaning that there is no activated connection to the selected access device. Indeed, in this case, the management entity has no way of knowing whether or not the access device selected by the terminal is able to manage the sleep and waking periods, which makes the reachability method all the more relevant.

According to another aspect of the invention, the method is implemented when the terminal is being served by the first access device according to the management entity.

The method is particularly useful during a period in which, according to the information available to the management entity, the terminal is being served by an access device that is unable to manage the sleep and waking periods of the terminal. The method actually allows a reliable item of information about the state of the terminal to be obtained. A lack of response from the terminal when the terminal is attached to the first device would probably mean that the terminal is out of service or outside of coverage, which is not necessarily the case if the terminal is being served by the second access device. Sending a contact-establishment message when the access device serving the terminal does not support the function of managing the waking and sleep of the terminal makes it possible to ascertain whether or not the terminal is accessible.

According to another aspect of the invention, in the detection method, the sending of the contact-establishment request message during the waking period follows the sending of at least one contact-establishment message during a sleep period of the terminal.

The nominal operation of the management entity consists in transmitting at least one contact-establishment request (paging) message when necessary, i.e. when data need to be transmitted to the terminal. The management entity transmits a first, immediate request and then several contact-establishment requests in the seconds that follow, irrespective of the sleep and waking periods of the terminal. A contact-establishment request message may thus be sent during a waking period in conjunction with nominal operation, allowing both cases to be covered, i.e. the case in which the mechanism such as eDRX is supported and the case in which it is not.

According to another aspect of the invention, in the detection method, the determination of the sleep and waking periods of the terminal takes place when the terminal registers with the communication network.

When the terminal registers, whether the latter has selected an access device that is able or unable to manage the sleep and waking periods of the terminal, the terminal and the management entity determine the sleep and waking periods or cycles, allowing the management entity to have access to the sleep and waking cycles for each registered terminal. For example, the management entity may set these respective periods. If the terminal registers via an access device that is able to manage the sleep and waking periods, the access device may participate in determining the respective periods.

According to another aspect of the invention, in the detection method, the first device is an access device of a mobile network using fifth-generation technology and the second device is an access device of a mobile network using fourth-generation technology.

The method may advantageously be implemented in a communication network in which the registration area comprises access devices using technologies of different generations, in particular fourth- and fifth-generation technologies, which devices do not offer the same functionalities. The device using fourth-generation technology, for example of eNB type, is able to manage the sleep and waking periods of a terminal, for example in accordance with the eDRX mechanism, whereas the device using fifth-generation technology, for example of gNB type, is unable to do so.

According to another aspect of the invention, in the detection method, the contact-establishment request message comprises a datum relating to the sleep and waking periods of the terminal.

The contact-establishment request message advantageously comprises a datum relating to the waking and sleep periods of the terminal. This datum in particular allows an equipment of an access network tasked with receiving the contact-establishment request message from the management entity to be able to transmit said message to the terminal during a waking period of the terminal, in accordance with the information contained in the message. This is useful, in particular, if the access device has not participated in the registration of the terminal with the communication network. The datum relating to the sleep and waking periods may, non-exhaustively, be the periods themselves, the time at which the terminal will next "wake up", or the time remaining until the end of the current sleep phase.

According to another aspect of the invention, the detection method further comprises the updating, by the management entity, of connectivity information relating to the terminal, said updating being carried out on the basis of data from a contact-establishment response message obtained from the terminal in response to the received contact-establishment request message.

Having detected the reachability of the terminal, following the response obtained from the terminal following the contact-establishment request, the management entity may advantageously take into account the data received in the response message in order to update the data relating to the terminal. In particular, the connectivity type and the new location may be updated if the cell in which the terminal is located is different from the last cell in which the terminal was in the connected state. The connectivity type may correspond to a different (cellular or non-cellular) technology or a different generation (3G, 4G or 5G).

The information about the support of a function managing sleep and waking periods of the terminals by an access device to which the terminal is attached may also be updated by the management entity.

According to another aspect of the invention, in the detection method, the management entity is an AMF core network device.

When the method is implemented in idle mode, it is advantageous for the management entity to be a core network equipment that manages the mobility of the terminal and is in charge of handling the accessibility of the terminal according to the prior art techniques.

According to another aspect of the invention, in the detection method, the management entity is an access device of the communication network.

When the method is implemented when the terminal is in a "CM (Connection Management)—Connected with RRC (Radio Resource Control) Inactive" state, it is advantageous for the management entity to be a device of the access network, such as a device of a radio network, for example of NG-RAN type, which manages the accessibility of the terminal to the access network in this mode. The management entity may be an eNodeB or gNB access station.

The invention also relates to a device for detecting the reachability of a terminal previously attached to a first access device of a registration area of a communication network, said area comprising said first access device, which is unable to manage sleep and waking periods of said terminal, and a second access device, which is able to manage said periods, comprising a learning module, which is able to determine sleep and waking periods of the terminal, an obtention module, which is able to obtain an item of information relating to data to be transmitted to the terminal, and a transmitter, which is able to send a contact-establishment request message to said terminal during a determined waking period of said terminal.

The invention also relates to a system for detecting the accessibility of a terminal, comprising a detection device, at least two access devices, one of which is unable to manage sleep and waking periods of a terminal, and a terminal, which is able to receive a contact-establishment request message during one of its waking periods.

The invention also relates to a computer program comprising instructions for implementing the steps of the detection method that has just been described, when said program is executed by a processor, and a recording medium readable by a detection device and on which the computer program is recorded.

This program may use any programming language and be in the form of source code, object code or intermediate code between source code and object code, such as in a partially compiled form, or in any other desirable form.

The invention also relates to a computer-readable information medium that includes instructions of the computer program as mentioned above.

The information medium may be any entity or device capable of storing programs. For example, the medium may include a storage means, such as a ROM, for example a CD ROM or a microelectronic circuit ROM, or else a magnetic recording means, for example a floppy disk or hard disk.

Alternatively, the information medium may be a transmissible medium such as an electrical or optical signal, which may be routed via an electrical or optical cable, by radio or by other means. The program according to the invention may, in particular, be downloaded from an Internet-type network.

Alternatively, the information medium may be an integrated circuit in which the program is incorporated, the circuit being suitable for executing or for being used in the execution of the method in question.

4. BRIEF DESCRIPTION OF THE DRAWINGS

Other advantages and features of the invention will become more clearly apparent on reading the following description of a particular embodiment of the invention, provided by way of simple illustrative and non-limiting example, and the appended drawings, in which:

FIG. 1 shows a communication network in which the detection method is implemented, according to a first embodiment of the invention, FIG. 2 shows an overview of the method for detecting the reachability of a terminal according to a second embodiment of the invention, FIG. 3 shows an example of the structure of a detection device according to one aspect of the invention.

5. DESCRIPTION OF THE EMBODIMENTS

The remainder of the description presents embodiments of the invention in a communication network. The communication network may be used to transmit data of terminals of any type, for example for the purposes of interpersonal communication or communication between machines.

Reference is first made to FIG. 1, which shows a communication network 10 in which the detection method is implemented, according to a first embodiment of the invention.

In this communication network 10, a mobile terminal 100 is moving within the network 10. The terminal 100 may, interchangeably, be a smartphone, a laptop computer, a communication module associated with a sensor or any equipment able to attach to the network 10. The communication network 10 is a mobile network which uses technologies such as those specified within the 3GPP (3rd Generation Partnership Project) organization.

When the terminal 100 attaches to the network 10 in order to transmit and/or receive data, said terminal is associated with a registration area RA. Just one registration area RA is depicted in the network 10, and each terminal is allocated its own registration areas. The registration area RA comprises a set of tracking areas. In the network 10, the registration area RA comprises three tracking areas designated TA1, TA2 and TA3. The terminal 100 is allocated the area RA comprising the tracking areas TA1, TA2 and TA3, while another terminal might be allocated a different registration area comprising, for example, the area TA1 and an area TA5 (not shown in [FIG. 1]). The tracking areas are defined by the operator administering the communication network 10. The registration area (RA) represents the awareness that the network 10 has of the location of the terminal 100 within it when the terminal 100 is in "idle" mode.

Moreover, a tracking area comprises several radio access stations. The tracking area TA1 comprises the radio access stations 101, 102, 103 and 104. In the network 10, the station 101 is considered to be an eNodeB station and the station 102 is considered to be a gNB station. An eNodeB access station is a station that implements certain LTE (Long Term Evolution) technologies collectively known as WB-E-UTRA (WideBand Evolved Universal Terrestrial Radio Access) and possibly also 3G technologies and communicates with the terminal 100 using radio waves. The eNodeB access station 101 transmits radio waves in several cells represented by Cell1, Cell2 and Cell3. A cell corresponds to a coverage area within which a terminal is able to transmit and receive data, which area is relative to the transmission power of the station 101, and each cell is further characterized by a frequency, known as the carrier frequency, used to transmit the radio signals to terminals within the cell. The eNodeB station 101 is moreover connected to a core network (not shown in FIG. 1) of the communication network 10.

The station 102 is a gNB station, i.e. an access station that implements NR (New Radio) technology for the radio links, both for the user plane and for the control plane. The gNB station is furthermore connected to the core network of the communication network 10. In the present case, the core network of the communication network 10 is considered to be a network that implements fifth-generation (5G) technologies. Thus, the core network known as 5GC is connected to access stations, some of which are based on NR, i.e. 5G, technology, and some of which access stations are based on LTE, i.e. 4G, technologies. The gNB access station 102 transmits radio waves on three cells identified as Cell4, Cell5 and Cell6 in FIG. 1 in accordance with the description in relation to the access station 101, with the difference that the access station 102 implements NR technology.

The access stations 103 and 104 are either eNodeB or gNB access stations or access stations that broadcast radio frequencies in accordance with different technologies. These access stations therefore also transmit radio frequencies, in each case on a set of cells not shown in FIG. 1.

In accordance with the description relating to the tracking area TA1, the tracking area TA2 comprises access stations 105 and 106, which transmit radio frequencies within the respective cells Cell7, Cell8, Cell9 and Cell10, Cell11, Cell12. The radio access station 105 is an eNodeB station that implements WB-E-UTRA technology and the radio access station 106 is a gNB access station that implements NR technology.

The tracking area TA3 also comprises access stations (not shown in the figure) in accordance with the above descriptions.

It should furthermore be noted that the registration area RA may comprise a number of tracking areas other than 3, and each tracking area may comprise a larger or smaller number of access stations of different types (eNodeB, gNB, other access stations), and the access stations may broadcast on a plurality of cells, the number of which may be other than 3.

The terminal 100, especially when it is moving, may thus listen to one or other of the access stations, i.e. be served by an access station belonging to a tracking area, using a frequency and coding specific to a given cell, and then change cells of the same access station or change access stations within the same tracking area, or even change to an access station in a different tracking area. The terminal 100 may also leave its registration area, i.e. the terminal 100 may be served by an access station that covers a tracking area which is not included in the initial registration, and the terminal 100 then has to register anew, the new registration area allocated by the network comprising the tracking area serving said terminal at the time of this new registration.

The different states that the terminal 100 is successively in are as follows:

In order to be able to exchange data with a correspondent, the terminal 100 has to register with the entities of the network 10, and in particular with an entity of the core network (not shown in FIG. 1), the AMF (Access and Mobility Management Function). The AMF of the network 10 registers the terminal 100 and manages the location of the terminal 100 by allocating said terminal a registration area comprising at least the tracking area corresponding to the access station that serves the terminal 100 at the time of registration and storing said registration area in association with the identity of the terminal. When it registers, the terminal 100 is authenticated, and configuration parameters allowing said terminal to transmit and receive data in the network 10 are assigned to said terminal.

When the terminal 100 exchanges data, it is in a CM-Connected state, meaning that signaling data and/or data known as payload data are transmitted between the terminal and an equipment of the core network 10, for example the AMF entity for the signaling data and a UPF (User Plane Function) equipment (not shown in [FIG. 1]) for the payload data. If the terminal 100 changes radio access stations (or possibly cells), the new radio access station informs the AMF equipment of the new location (cell identifier), and the AMF (and also the UPF after an exchange of information between the AMF, the SMF (Session Management Function) and the UPF) may transmit data intended for the terminal 100 to the access station serving the terminal 100.

There is an intermediate state, "CM-Connected with RRC inactive", in which the terminal is connected from the point of view of the AMF entity, but there are no radio exchanges between the terminal 100 and an entity of the access network of the network 10. The terminal 100 does not inform the entity of the access network if it changes cells unless it leaves its notification area.

A notification area shares common concepts with a tracking area, but is specific to the access network (for example to the radio access network).

When the terminal enters the RRC-INACTIVE state, it is assigned a notification area. This area may be submitted in any form (list of cells, list of tracking areas, tracking areas and cells, etc.). When the terminal 100 leaves its notification area, it must inform the new access station serving it thereof in order for said new access station to retrieve the information contained in the access station that was previously serving the terminal, i.e. before the terminal moved, for example.

From the point of view of the core network (in particular from the point of view of the AMF), the terminal 100 is connected, but from the radio point of view, the terminal 100 is inactive, i.e. there are no radio resources dedicated to communicating with the radio access station, but the terminal is listening for signaling messages transmitted thereto, in particular to ask said terminal to transition back into the RRC-Connected state.

When the terminal 100 is in idle mode (CM-Idle), meaning that there is no active communication between the terminal and an equipment of the network 10, there is no signaling exchange between the terminal 100 and the AMF equipment. In this state, the terminal 100 selects a new cell autonomously, i.e. without informing the AMF entity thereof, in particular after a movement. The terminal then uses the information broadcast by an access station in the cells under whose coverage it is and the signal level in each of these cells to select a cell and an access station. This is then referred to as the terminal being served by the access station. The terminal transmits a signaling message to the AMF entity only if, within the selected new cell, an item of information relating to a tracking area that differs from those in which the terminal is registered is broadcast, i.e. one that differs from TA1, TA2 and TA3 in the network 10. If an item of information relating to a tracking area included in the registration area RA is broadcast in the new cell, the terminal listens for this item of information but does not transmit any information to the AMF entity, and the terminal is then served by the access device that broadcasts the radio information in the cell covering the geographical area in which the terminal 100 is located. For example, if the terminal 100 is listening for information relating to the cell Cell7 of the access device 105, said terminal is considered to be served by the device 105, but the terminal has not performed a procedure of registering with the network from said cell Cell7 and the device 105.

Furthermore, in a CM-Idle or "CM-Connected with RRC inactive" mode, the terminal 100 may use the eDRX function, which consists in the terminal 100 placing itself, successively, in a waking state in which it listens for contact-establishment request messages, also known as paging messages, and in a sleep state in which the terminal does not listen to the signaling messages. Since the network 10 is not consistent in terms of support for the eDRX function, information problems may arise for the management equipment in charge of sending these paging messages, namely the AMF entity or an entity that manages radio access such as an eNodeB or gNB access station. If the management entity believes that the terminal 100 is being served by the cell Cell6 of the access station 102, which does not support the eDRX function, whereas the terminal 100 is in fact being served by the cell Cell7 of the access station 105, which does support the eDRX function, for example following a movement of the terminal 100 while the terminal is in a CM-Idle or "CM-Connected with RRC inactive" state, the entity transmitting the paging messages may not consider the eDRX function for establishing contact with the terminal 100. The method thus allows the AMF management entity or an access station managing the radio access to transmit at least one paging message during a waking phase of the terminal 100, whether said entity considers that the terminal 100 is being served by an access station that supports eDRX or by an access station that does not support eDRX, whether the terminal uses eDRX or not. All the access stations, including the access station 105, that do indeed support eDRX, will send the paging message to the terminal 100 during a waking period of the terminal 100, while the AMF entity assumed and determined that the terminal 100 was covered by the access station 102 that does not support the eDRX function. The AMF does indeed send the paging message to all the access stations of the registration area RA in CM-Idle mode, which actually allows the access station 102 and the access station 105 to receive the message. All the access stations that receive this message broadcast it in their cells: both the (eNodeB) access stations that support eDRX, taking eDRX into account since they know exactly when the waking phase begins (in accordance with an item of PTW—Paging Time Windows—information relating to eDRX), and the access stations that do not support eDRX (for example the gNB access stations). However, only the message broadcast in the cell on which the terminal 100 is camped, i.e. the message transmitted by the access station 105 that is serving the terminal 100, will actually be received by the terminal 100. In CM-Connected with RRC Inactive mode, the AMF (for the signaling data) or the UPF (for the payload data) transmits the data to the access station 102, which transmits a message to all the access stations of the notification area of the radio access network (RAN Notification Area), therefore to the station 105, allowing said stations to establish contact with the UE in order to transmit said data thereto.

Then, the access station 105 transmits a paging message to the terminal 100. The method for detecting the reachability of the terminal 100 thus makes it possible to correct an item of information about the access station that is serving the terminal 100, the AMF management entity wrongly considering that the terminal 100 is being served by the access station 102 which does not support eDRX, the network 10 comprising access stations which support the eDRX function and access stations which do not support the eDRX function.

The AMF entity must initially learn said waking and sleep periods, for example during the phase of registration of the terminal 100 with the network 10.

The embodiment of FIG. 1 is based on eNodeB stations and gNB stations, but the method can also be used in a network comprising other types of access stations that are not consistent in terms of the management of the waking and sleep states of the terminals, the eDRX function being an example of such a function.

In relation to FIG. 2, an overview of the method for detecting the reachability of a terminal according to a second embodiment of the invention is presented. Reachability consists in being able to determine whether a terminal is accessible or else whether it is possible to be able to establish contact with said terminal.

During a step 300, the mobile terminal 100 transmits a request for attachment to the communication network 10. During the attachment procedure, said terminal registers and is authenticated with the network 10 according to the known registration methods, in particular those specified by 3GPP. The terminal 100 is served by the access device (also known as access station or access node) 101 of the network 10. The access device 101 is an eNodeB device and the terminal 100 attaches to the 5GC network (5G Core Network) 10.

During step 300, the access station does not consult the eDRX parameters, and the registration can also be carried out via a gNB access station by the terminal 100 supporting the eDRX function.

The eNodeB 101 transmits the registration request to a management entity 110 of the core network 10 during a step 301. In one example, the management entity 110 is an AMF device of the network 10. The registration request made during steps 300/301 may contain the eDRX parameters that the terminal 100 wishes to use. The eDRX function is a function allowing the terminal 100 and the network 10 to agree on waking and sleep periods of the terminal 100. The eDRX parameters may in particular contain the duration of the waking periods (P1) and sleep periods (P2) desired by the terminal 100.

During step 302, the AMF entity 110 transmits an attachment response message to the terminal 100, indicating to the terminal that the latter is attached to and authenticated with the network 10. In another example, during this step 302, the terminal 100 and the AMF entity 110 negotiate the duration of the waking periods (P1) and sleep periods (P2) of the terminal 100. The AMF may, for example, impose the durations P1 and P2. Thus, by virtue of messages exchanged during the registration of the terminal 100 with the network 10, the AMF entity 110 learns the waking periods (P1) during which it will be able to transmit signaling data to the terminal 100 since the terminal 100 will be listening during these periods. The waking periods P1 and sleep periods P2 may be transmitted either in messages exchanged during steps 300/301 or during step 302.

Step 302 may thus comprise the transmission and the reception, by the terminal 100, of several messages for registration and negotiation of the periods relating to the eDRX function. Likewise, the AMF entity 110 may transmit messages to, and receive messages from, other entities (UDM (Unified Data Management), PCF (Policy Control Function), etc.) for the attachment of the terminal 100.

According to another example, the waking and sleep periods may be learned during a distinct phase of the registration phase, for example using specific messages transmitted after the registration phase.

During a step 304, the terminal 100 moves in "idle" mode or in the "CM-CONNECTED with RRC-Inactive" state and is therefore no longer served by the eNodeB 101. During step 303, the terminal in fact receives a radio signal from the gNB access device 102 which implements NR technology, and, since this radio signal is stronger than the radio signal of the eNodeB 101, the terminal selects the gNB 102.

Since gNB 102 indicates to said terminal, in the information broadcast thereby, that it belongs to TA1, which is part of the RA of the terminal 100, the terminal 100 does not signal its mobility to the AMF entity 110. The terminal 100 deactivates the eDRX function since it is not supported by NR technology. Later, the terminal 100, wishing to transmit payload data or signaling data, sends a message to the AMF entity 110 during step 305, for example using a "Service Request" procedure. This message sent from the terminal 100 to the AMF 110 travels via gNB 102, which inserts its identity into the message; the AMF 110 thus learns at this point that the terminal 100 is being served by a gNB entity 102 which therefore does not support the eDRX function. It should be noted that if the access station 102 is not in the registration area of the terminal 100, then the terminal 100 performs a new registration procedure and the AMF entity 110 is informed of the location of the terminal 100 when this registration takes place. This step 305 comprises location update and acknowledgement exchanges between the terminal 100 and the AMF entity 110 via the access station 102. During a step 306, the terminal 100 transmits data to, for example, a corresponding terminal 108. If the transmitted data are signaling data, they are transmitted to the AMF entity 110.

The moving terminal 100 then receives a radio message from the eNodeB 105 during step 307, allowing said terminal to detect, during step 308, that it is now being served by the access station 105, which is an eNodeB, and no longer by the gNB access station 102. The terminal 100 implements the eDRX function. According to one alternative, the terminal 100 moves while the terminal 100 is in idle mode, meaning that there is no active connection for transmitting or receiving data routed through the network 10. It should be noted that a change in the access device serving a terminal 100 may occur without the terminal 100 moving. At this point, the AMF entity 110 has not received any update of the location of the terminal 100 and therefore wrongly believes that the terminal 100 is still being served by the access station 102.

During a step 310, the AMF entity 110 obtains an item of information relating to data to be transmitted to the terminal 100. The data may be data known as payload data relating to an application, or else signaling data. The AMF entity 110 is for example called upon by the node 106 to establish contact with the terminal 100. According to one example, the node 106, which is an SMF (Session Management Function) entity, transmits a Namf_Communication_N1N2MessageTransfer message to the AMF entity 110 during a step 309, triggering the sending of a paging message to the terminal 100 by the AMF entity 110.

According to the latest information at its disposal, the AMF entity 110 has determined that the terminal 100 is being served by the gNB access station 102. The AMF entity 110 moreover knows that the terminal 100 supports eDRX based on the information exchanged during steps 301 and 302. The AMF entity 110 wrongly assumes that the terminal is being served by the gNB entity 102 which does not support eDRX, but nevertheless takes into account the exchanged eDRX parameters in order to establish contact with the terminal 100 during a waking phase of the terminal 100.

During a step 312, the AMF entity 110 wishes to establish contact with the terminal 100. Since the terminal 100 is in idle mode, the AMF entity transmits, during this step 312, a contact-establishment request message (paging message) to all the access stations of the registration area RA during a period P1 corresponding to a waking phase of the terminal 100, or shortly before a period P1 in order to allow the access stations to process the message and allow the terminal 100 to receive the message during a period P1. In FIG. 2, the three access stations 101, 102, 105 receive a paging message. The access station 105 which is actually serving the terminal 100 transmits the paging message to the terminal 100.

According to one alternative, during steps 311*a*, 311*b* and 311*c*, the AMF entity 110 initially transmits one or more contact-establishment messages (paging messages) to the access stations of the registration area RA, i.e. to the access stations 101, 102, 105, in order to be able to reach the terminal 100 during a sleep phase P2. Sending several messages during the phase P2 makes it possible to avoid an unnecessary response delay if the terminal 100 is being served by the node 102 or any other access station of the registration area RA that does not support eDRX. It should be noted that according to one optimization method, the AMF entity 110 may be configured to send a paging message only to the access station 102, which is serving the terminal 100 as far as the AMF entity 110 is aware, the paging message then being transmitted afterwards to other access stations of the registration area if the terminal 100 does not respond to the paging message transmitted to the access station 102.

According to one alternative, the contact-establishment message transmitted by the AMF entity 110 during step 312 further comprises information allowing the entities of the access network to reach the UE during its waking periods (which information may correspond to the waking phases (P1) and sleep phases (P2) initially negotiated between the terminal 100 and the AMF entity 110). Thus, the access stations receiving the message, including the one that is actually serving the terminal 100, may, if they support eDRX, exploit this information to transmit the message when the terminal 100 is in a waking phase (P1).

During a step 313, the terminal 100 sends a response message, for example of "Service Request" type, to the AMF entity 110 in response to the received contact-establishment request. According to one alternative, this message is used by the AMF entity 110 to update data relating to the terminal 100, for example an item of location information corresponding, for example, to an item of information about the access station serving the terminal 100, a connectivity type or an update of the waking and sleep periods. The information about the support of the eDRX function may also be updated.

According to another embodiment, the terminal 100 moves during step 308 while it is, for example, in a CM-Connected with RRC Inactive state. The management entity 110 which manages the mobility of the terminal is an access equipment of the communication network 10 such as an eNodeB equipment.

Reference is now made to FIG. 3, which shows an example of the structure of a detection device according to one aspect of the invention.

The detection device 400 implements the detection method in the various embodiments that have just been described.

A detection device 400 of this kind may be implemented in a core network equipment of a communication network, for example an AMF equipment, which may be instantiated by a virtual instance, or an equipment of an access network, which, for example, transmits and receives data transmitted to or from a terminal via a radio medium.

For example, the device 400 comprises a processing unit 430 provided, for example, with a microprocessor μP and controlled by a computer program 410, which is stored in a memory 420 and implements the detection method according to the invention. On initialization, the code instructions of the computer program 410 are, for example, loaded into a RAM memory before being executed by the processor of the processing unit 430.

A device 400 of this kind comprises:
- a learning module 401, which is able to determine sleep and waking periods of a terminal,
- an obtention module 402, which is able to obtain an item of information relating to data to be transmitted to the terminal,
- a transmitter 403, which is able to transmit a contact-establishment request message Dem to said terminal during a determined waking period of said terminal.

The method for detecting the reachability of a terminal, various embodiments of which are described above, makes it possible to prevent an equipment of a communication network from wrongly concluding that a terminal is inaccessible and that said terminal thus cannot receive data intended therefor. A terminal which uses eDRX, is in the idle state and is moving in a communication network cannot be located by an equipment of the network if the equipment in question calls upon it unexpectedly, since it is very likely that the request is transmitted when the terminal is in a sleep period. Indeed, in idle mode, the terminal places itself in the waking state only during short periods in order, in particular, to be able to listen for messages transmitted thereto and, in particular, in order to be able to receive the data intended therefor. There is therefore a need to synchronize the sending of the request messages from the network equipment with the waking periods of the terminal.

When the network equipment has to call upon the terminal, since it does not know which access station is able to transmit the data to the moving terminal, said network equipment therefore has to envisage that the access station serving the terminal is capable of managing the waking and sleep periods of the terminal. The network equipment has to call upon the terminal during a waking period in order to obtain a reliable item of information about the accessibility of the terminal. Thus, the transmission of the data to the terminal will be ensured and accelerated, and it will be ensured that the location of the terminal is updated. Indeed, calling upon the terminal during a sleep period thereof will indicate to the network equipment that the terminal is unreachable, whereas it is asleep, and therefore reachable during clearly determined periods.

The invention claimed is:

1. A method comprising:
   detecting the reachability of a terminal previously served by a first access device of a registration area of a communication network, wherein the first access device is unable to manage sleep and waking periods of said terminal, then served by a second device of said registration area, wherein the second device is able to manage said periods, said detecting being implemented by a management entity of said network, wherein the management entity has not been informed of a change of access device and gets information indicating that the terminal is being served by the first access device, and wherein the detecting comprises:
   exchanging messages with the terminal for registration and negotiation of the sleep and waking periods of the terminal,
   obtaining an item of information relating to data to be transmitted to the terminal, and
   sending a contact-establishment request message to said terminal during a determined waking period of said terminal.

2. The detection method as claimed in claim 1, wherein the method is implemented when the terminal is in idle mode.

3. The detection method as claimed in claim 1, wherein the sending of the contact-establishment request message during the waking period follows the sending of at least one contact-establishment message during a sleep period of the terminal.

4. The detection method as claimed in claim 1, wherein the determination of the sleep and waking periods of the terminal takes place when the terminal registers with the communication network.

5. The detection method as claimed in claim 1, wherein the first device is an access device of a mobile network using fifth-generation technology and wherein the second device is an access device of a mobile network using fourth-generation technology.

6. The detection method as claimed in claim 1, wherein the contact-establishment request message comprises a datum relating to the sleep and waking periods of the terminal.

7. The detection method as claimed in claim 1, further comprising updating, by the management entity, connectivity information relating to the terminal, said updating being carried out on the basis of data from a contact-establishment response message obtained from the terminal in response to the received contact-establishment request message.

8. The detection method as claimed in claim 1, wherein the management entity is an Access and Mobility Management Function (AMF) core network device.

9. The detection method as claimed in claim 1, wherein the management entity is an access device of the communication network.

10. A detection device for detecting reachability of a terminal previously served by a first access device of a registration area of a communication network, wherein the first access device is unable to manage sleep and waking periods of said terminal, then served by a second device of said registration area, wherein the second device is able to manage said periods, the detection device comprising:
- a transmitter;
- a processor; and
- a non-transitory computer-readable medium comprising instructions stored thereon which when executed by the processor configure the detection device, which has not been informed of a change of access device and gets information indicating that the terminal is being served by the first access device, to:
- exchange messages with the terminal for registration and negotiation of the sleep and waking periods of the terminal,
- obtain an item of information relating to data to be transmitted to the terminal, and
- use the transmitter to send a contact-establishment request message to said terminal during a determined waking period of said terminal.

11. A system for detecting the reachability of a terminal previously served by a first access device of a registration area of a communication network, wherein the first access device is unable to manage sleep and waking periods of said terminal, then served by a second device of said registration area, wherein the second device is able to manage said periods, the system comprising:
- a detection device comprising:
  - a transmitter;
  - a processor; and
  - a non-transitory computer-readable medium comprising instructions stored thereon which when executed by the processor configure the detection device, which has not been informed of a change of access device and gets information indicating that the terminal is being served by the first access device, to:
    - exchange messages with the terminal for registration and negotiation of the sleep and waking periods of the terminal,
    - obtain an item of information relating to data to be transmitted to the terminal, and
    - use the transmitter to send a contact-establishment request message to said terminal during a determined waking period of said terminal;
- at least the first and second access devices; and
- the terminal, which is able to receive the contact-establishment request message during one of the terminal's waking periods.

12. A non-transitory computer-readable recording medium comprising instructions stored thereon for implementing a method of detecting reachability of a terminal, when the instructions are executed by a processor of a management entity of a communication network, wherein the terminal is previously served by a first access device of a registration area of the communication network, wherein the first access device is unable to manage sleep and waking periods of said terminal, and then served by a second device of said registration area, wherein the second device is able to manage said periods, wherein the management entity has not been informed of a change of access device and gets information indicating that the terminal is being served by the first access device, and wherein the method comprises:
- exchanging messages with the terminal for registration and negotiation of the sleep and waking periods of the terminal,
- obtaining an item of information relating to data to be transmitted to the terminal, and
- sending a contact-establishment request message to said terminal during a determined waking period of said terminal.

* * * * *